United States Patent [19]
Colling et al.

[11] Patent Number: 5,793,016
[45] Date of Patent: Aug. 11, 1998

[54] REMOTE FOOT CONTROL FOR TIG WELDING

[75] Inventors: Ronald W. Colling, Appleton; Kenneth F. Herres, Sherwood, both of Wis.

[73] Assignee: Illinois Tool Works Inc., Glenview, Ill.

[21] Appl. No.: 781,440

[22] Filed: Jan. 10, 1997

[51] Int. Cl.$^6$ .................................................. B23K 9/10
[52] U.S. Cl. .................................... 219/132; 338/153
[58] Field of Search ................... 219/74, 75, 132; 338/153

[56] References Cited

U.S. PATENT DOCUMENTS

| | | | |
|---|---|---|---|
| 2,349,891 | 5/1944 | Tymer | 219/132 |
| 2,681,586 | 6/1954 | Pressler | 84/1.27 |
| 2,798,209 | 7/1957 | Gordon | 219/132 |
| 3,371,506 | 3/1968 | Zahn | 67/7.1 |
| 3,402,341 | 9/1968 | Cook | 322/16 |
| 4,227,066 | 10/1980 | Bulwidas, Jr. | 219/132 |
| 4,322,711 | 3/1982 | Spangler et al. | 338/153 |
| 4,345,607 | 8/1982 | Contreras et al. | 132/83 |
| 4,787,590 | 11/1988 | Melvin | 248/293 |

FOREIGN PATENT DOCUMENTS 3544280  9/1987  Germany ............................. 219/74

*Primary Examiner*—Clifford C. Shaw
*Attorney, Agent, or Firm*—Mark W. Croll; Thomas W. Buckman; John P. O'Brien

[57] ABSTRACT

A foot control for a TIG welding machine utilizes a timing belt that is tensioned between a pedal and an enclosure. The timing belt meshes with a timing gear that is fixed to a rotatable shaft. Pivoting the pedal on the enclosure causes the timing belt to travel past and rotate the gear and shaft. A potentiometer on the shaft also rotates to control the power output of the welding machine. The belt is tensioned by a relatively weak spring in a manner that biases the pedal in one direction on the enclosure. A stronger spring biases the pedal in the opposite direction. The pedal is hinged to the enclosure by resilient tabs on the enclosure having bosses that engage holes in the pedal. The tab bosses can be depressed to disengage the pedal holes and enable the pedal to be removed from the enclosure. A heavy base joined to the enclosure has plates that lie alongside the enclosure tabs such that the tab bosses cannot be depressed out of engagement with the pedal holes when the base is joined to the enclosure.

21 Claims, 3 Drawing Sheets

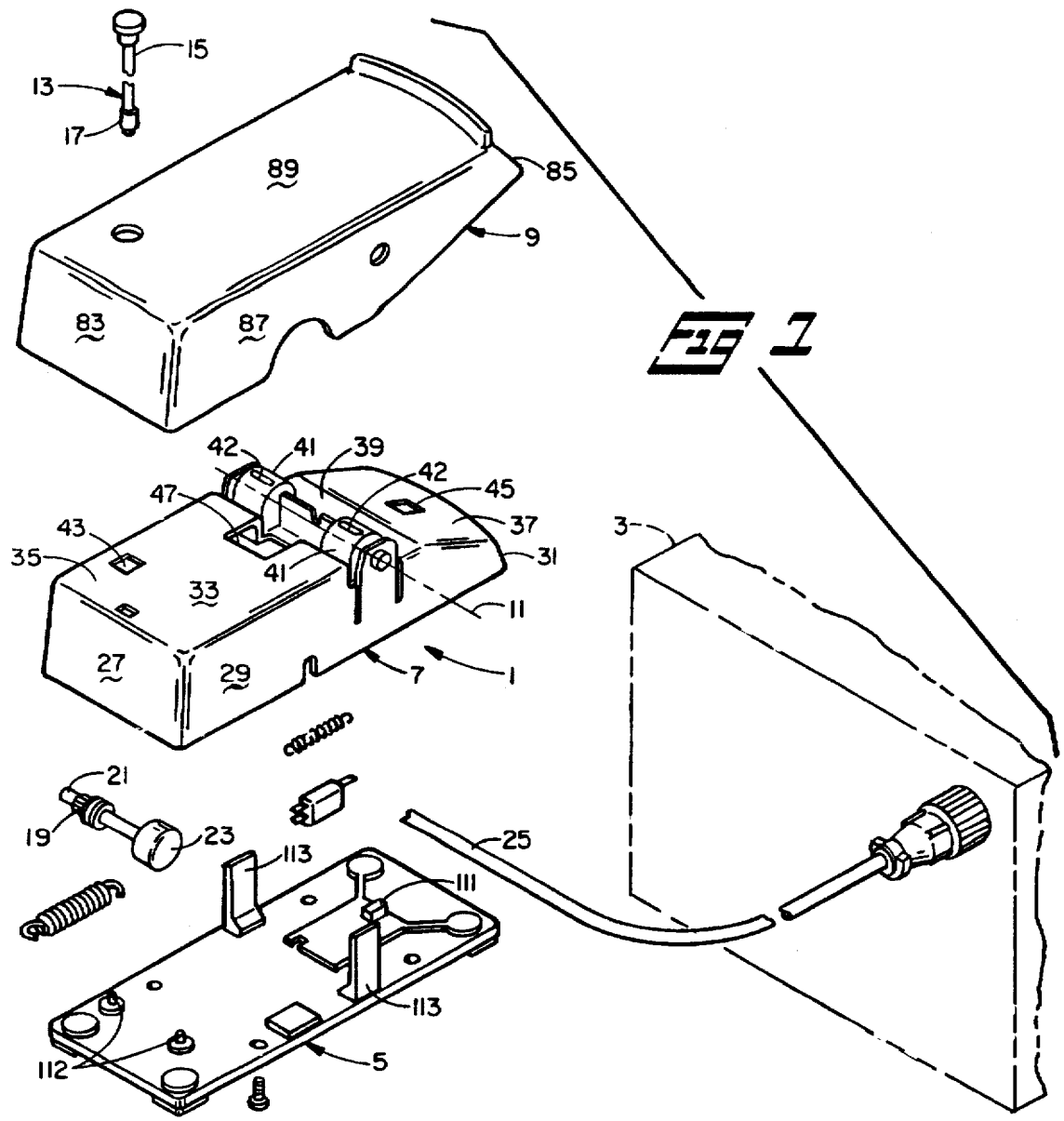

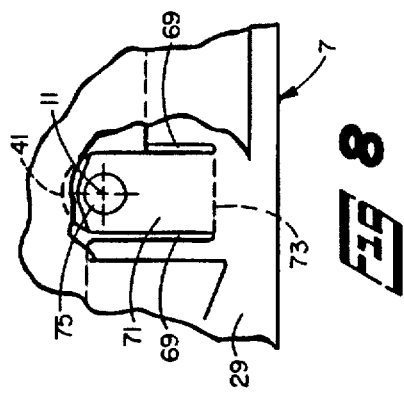
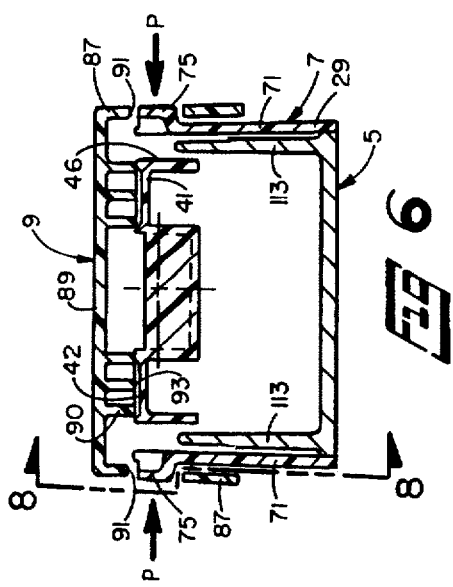
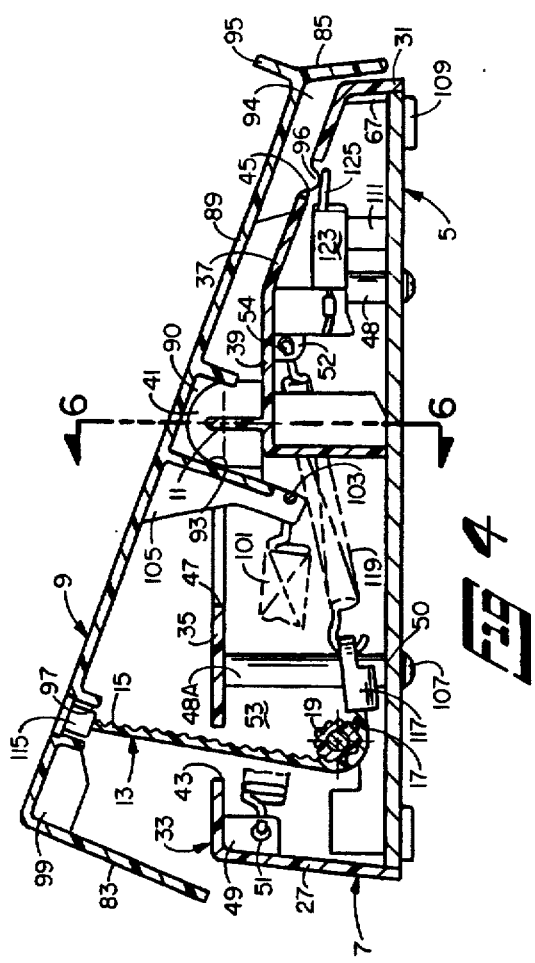
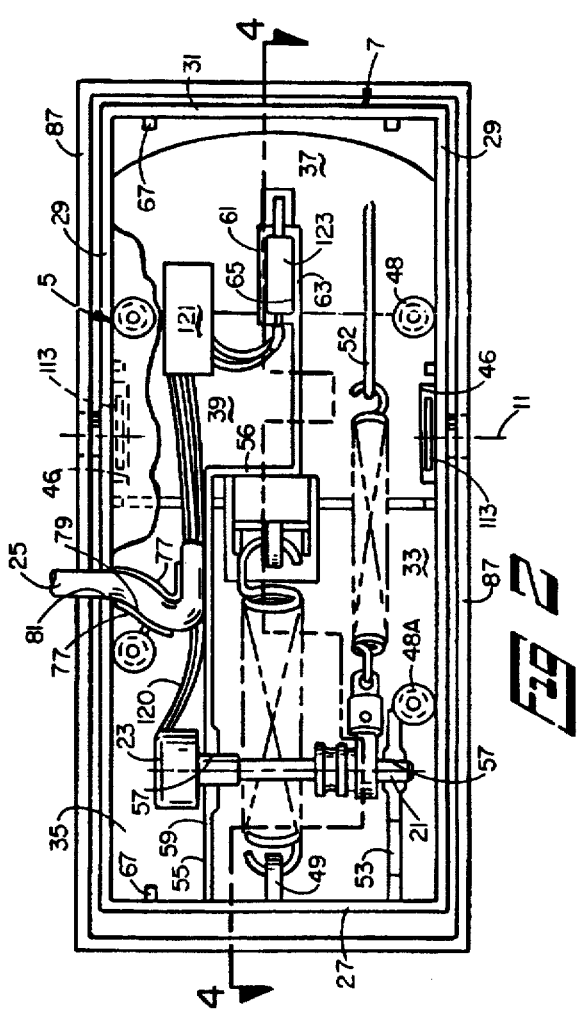

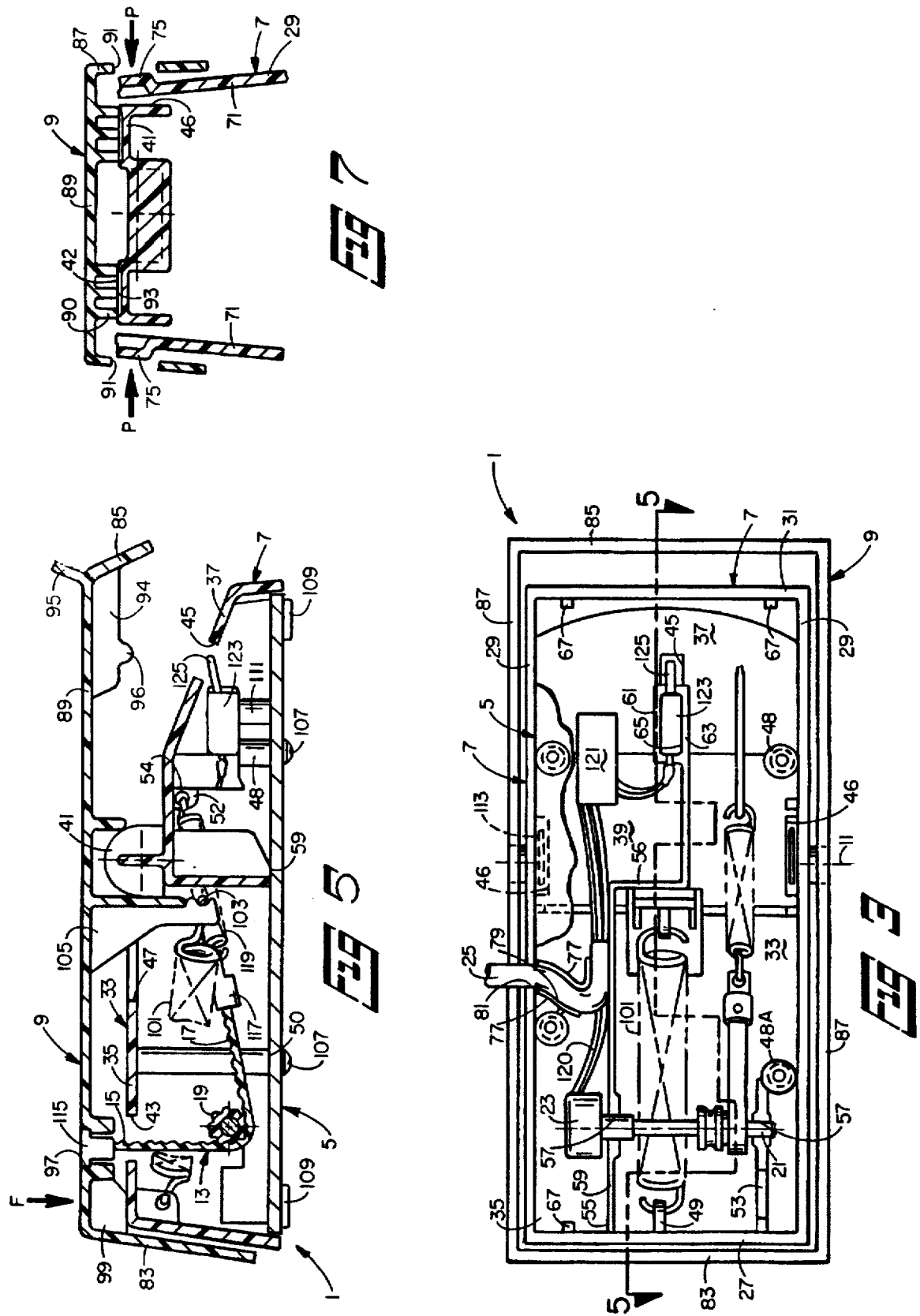

REMOTE FOOT CONTROL FOR TIG WELDING

BACKGROUND OF THE INVENTION

1. Field of the Invention

This invention pertains to controlling welding processes, and more particularly to remote foot controls for TIG welding machines.

2. Description of the Prior Art

It is well known to control a TIG welding arc from a location remote from the welding machine. A rather common way to control the arc is with a potentiometer regulated by a foot of the welding machine operator. The potentiometer is part of a pedal mechanism such that depressing and releasing the pedal varies the current to the welding arc.

Although prior welding foot controls have met with some commercial success, they nevertheless possess several drawbacks. For example, some prior foot controls used gears to transmit motion from the pedal to the potentiometer. The gears produced backlash in the system. In addition, although the center distance between the gears was critical, the gears were mounted in sheet metal stampings. That design made the gear center distance difficult to control.

Another disadvantage of some prior foot controls was that they contained fifty or more individual pieces, thereby rendering them expensive to manufacture and prone to failure. In the prior designs, all the force of the operator's foot was supported at two discrete points on a hinge pin between the pedal and a base. The result was excessive wear on the hinge pin.

Thus, a need exists for improvements in foot controls for welding machines.

SUMMARY OF THE INVENTION

In accordance with the present invention, a remote foot control is provided for TIG welding machines that is more economical and reliable than prior foot controls. This is accomplished by apparatus that includes a tensioned timing belt that meshes with a timing gear to rotate a potentiometer.

The timing gear is fixed to a shaft that is rotatably mounted in an open-sided enclosure. The shaft is connected to the potentiometer. One end of the timing belt is secured to a pedal, which is hinged to the enclosure. The timing belt wraps approximately 90 degrees around the timing gear in a manner that holds the shaft in slots in the enclosure. A second end of the timing belt is attached via a first spring to the enclosure. A second and stronger spring is connected between the enclosure and the pedal. The second spring biases the pedal to a first position relative to the enclosure.

When the pedal is in the first position, the timing belt first end is remote from the gear, the timing belt second end is close to the timing gear, and the first spring is fully extended. Pivoting the pedal against the force of the second spring toward a second position causes the first end of the timing belt to approach the timing gear. The first spring keeps a tension on the belt, which causes the belt second end to move away from the gear. The belt thus travels past the gear, causing the gear to rotate. Rotation of the gear causes corresponding rotation of the shaft and of the potentiometer. The potentiometer is electrically connected to the welding machine to control the characteristics of the welding arc according to the rotation of the potentiometer. Releasing the force on the pedal causes the second spring to return the pedal toward its first position, thereby reversing the travel of the belt over the gear and causing the shaft and potentiometer to rotate without backlash in the opposite direction. In that manner, the welding machine is controlled by the position of the pedal relative to the enclosure.

For smooth operation of the foot control, the hinge between the enclosure and the pedal has a large bearing area. Consequently, the foot control is capable of carrying heavy forces, such as the full weight of a person standing on it, without adverse effect. To further enhance the performance of the foot control, grease cups are incorporated into the hinge.

To retain the pedal on the enclosure, a pair of resilient tabs are used. First ends of the tabs are cantilever joined to the enclosure. Second ends of the tabs have respective short bosses that engage associated holes in the pedal. Manually depressing the bosses bends the tabs and disengages the bosses from the pedal, thereby enabling the pedal to be removed from the enclosure.

To protect the belt, gear, and other components, the enclosure is covered with a heavy base. The base also provides mass to the foot control. It is a feature of the invention that the pedal cannot be removed from the enclosure unless the base is first removed from the enclosure. For that purpose, the base is formed with two upstanding plates that lie alongside the resilient tabs of the enclosure when the base is joined to the enclosure. The plates prevent the tab bosses from being depressed and thereby prevent disengagement of the bosses from the holes in the pedal. Only if the base is removed from the enclosure can the tab bosses be depressed.

The method and apparatus of the invention, using a tensioned timing belt meshing with a timing gear, thus controls a welding process in an accurate and reliable manner. The presence of the base on the enclosure prevents removal of the pedal from the enclosure, even though such removal is easily achieved when the base is removed from the enclosure.

Other advantages, benefits, and features of the present invention will become apparent to those skilled in the art upon reading the detailed description of the invention.

BRIEF DESCRIPTION OF THE DRAWINGS

FIG. 1 is an exploded perspective view of the foot control of tale present invention.

FIG. 2 is a broken bottom view of the foot control showing it in an inoperative position.

FIG. 3 is a view similar to FIG. 2, but showing the foot control in an operative position.

FIG. 4 is a cross sectional view taken along line 4—4 of FIG. 2.

FIG. 5 is a cross sectional view taken along line 5—5 of FIG. 3.

FIG. 6 is a cross sectional view taken along line 6—6 of FIG. 4.

FIG. 7 is a view similar to FIG. 6, but showing the tabs of the enclosure depressed to enable the pedal to be removed from the enclosure.

FIG. 8 is a broken view taken along line 8—8 of FIG. 6.

DETAILED DESCRIPTION OF THE PREFERRED EMBODIMENT

Although the disclosure hereof is detailed and exact to enable those skilled in the art to practice the invention, the physical embodiments herein disclosed merely exemplify the invention, which may be embodied in other specific structure. The scope of the invention is defined in the claims appended hereto.

General

Referring to FIG. 1, a foot control 1 is illustrated that includes the present invention. The foot control 1 is particularly useful for controlling a gas tungsten arc (TIG) welding machine 3. The welding machine 3 forms no part of the present invention.

The foot control 1 is comprised of a base 5, an enclosure 7, and a pedal 9. The pedal 9 is removably hinged to the enclosure 7 for pivoting about a horizontal axis 11. A timing belt 13 has one end 15 secured to the pedal and a second end 17 attached to a spring 119 which is attached to the enclosure. The timing belt 13 meshes with a timing gear 19 that is fixed to a shaft 21. The shaft 21 is mounted for rotation in the enclosure. A potentiometer 23 is also connected to the shaft.

Pivoting the pedal 9 on the enclosure 7 causes the timing belt 13 to travel past and thereby rotate the gear 19 and also the potentiometer 23. The potentiometer is electrically connected via cable 25 to the welding machine 3 such that varying the position of the pedal on the enclosure varies the operating characteristics of the welding machine.

Enclosure

The enclosure 7 is preferably manufactured by molding it from a high impact strength plastic material. The enclosure has a first end wall 27, two side walls 29, a second end wall 31, and a top wall 33. The bottom of the enclosure is open, FIGS. 2–5. In the illustrated construction, the top wall 33 has a first section 35 adjacent the first end wall 27, a sloped section 37 adjacent the second end wall 31, and an intermediate section 39 between the first section and the sloped section. On the top wall intermediate section 39 is a hinge in the form of a pair of trunnions 41 that define the axis 11. There is a shallow groove 42 in the apex of each trunnion 41. The top wall first section 35 has an opening 43, and the sloped section 37 has an opening 45. There is a central opening 47 in the top wall that lies within both the first section and the intermediate section 39. The top wall intermediate section has a pair of openings 46 adjacent the side walls 29 and centered on the axis 11.

The enclosure 7 further includes several long posts 48 that run along the side walls 29. All the posts 48 terminate in a common plane 50. A small rib 49 is at the junction of the first end wall 27 and the top wall 33 approximately midway between the two side walls 29. The rib 49 has a hole 51 through it. Another rib 52 underlies the top wall 33 at the junction of the intermediate section 39 and the sloped section 37. The rib 52 is offset from the rib 49, and the rib 52 has a hole 54 through it.

The enclosure 7 also has a pair of longitudinally extending ribs 53 and 55 at the junction of the first end wall 27 and the top wall 33. The ribs 53 and 55 have respective slots 57 that terminate in concentric semi-circles. The rib 53 terminates at a post 48A. The rib 55 extends for the full length of the top wall first section 35 and under the top wall intermediate section 39. The rib 55 makes a jog 56 under the top wall intermediate section, and then continues toward and underlies part of the top wall sloped section 37. For most of its length, the rib 55 has a bottom surface 59 that is coplanar with the plane 50. There is a small plate 61 depending from the top wall sloped section. The plate 61 is parallel to and accurately spaced from the back end 63 of the rib 55. The plate 61 and the back end 63 of the rib 55 cooperate to define a pocket 65. Preferably, the enclosure end walls 27 and 31 have small ribs 67 that have respective end surfaces that are coplanar with the plane 50. Extending inwardly from one of the enclosure side walls 29 are a pair of curved ribs 77 that define a channel 79. There is a slot 81 in the side wall that is aligned with the channel 79.

Looking also at FIGS. 6 and 8, each side wall 29 of the enclosure 7 is partially cut in two places 69 symmetrically about the axis 11. The result is a tab 71 that can bend along a line 73 in directions parallel to the axis 11. On the free end of each tab 71 concentric with the axis 11 is an outturned circular boss 75.

Pedal

The pedal 9 of the foot control 1 is preferably manufactured from the same material as the enclosure 7. The pedal has a first end wall 83, a second end wall 85, two side walls 87, and a top wall 89. A heel rest 95 upstands from the junction of the top and back walls 89 and 85, respectively. The pedal is sized to fit loosely over the enclosure.

Depending from the pedal top wall 89 are a series of ribs 90 having respective concentric concave arcuate end surfaces 93. The radius of the arcuate surfaces 93 is the same as the radius of the enclosure trunnions 41. The pedal side walls 87 have concentric holes 91 through them that are sized and located to loosely receive the bosses 75 of the enclosure tabs 71 when the pedal ribs 90 are placed on the enclosure trunnions. The ability of the enclosure tabs to bend along the lines 73 enables the pedal to be placed over the enclosure and retained thereto by the engagement of the enclosure tab bosses 75 with the pedal holes 91. To assure minimum friction between the pedal and the enclosure, the grooves 42 in the trunnion filled with a suitable grease.

Looking at FIG. 7, the pedal 9 can be removed from the enclosure 7 by applying forces P to the bosses 75. The forces P cause the enclosure tabs 71 to bend such that the bosses disengage from the pedal holes 91. The pedals can then be removed from the enclosure.

The pedal top wall 89 has a counterbored opening 97 near the first end wall 83, FIGS. 4 and 5. The opening 97 is longitudinally aligned with the opening 43 in the enclosure top wall 33. The pedal further includes a long arm 105 that depends from the top wall. Near the free end of the arm 105 is a depression 103. The arm extends through the opening 47 in the enclosure top wall.

Referring especially to FIG. 4, the pedal 9 is pivotable on the enclosure 7 in a clockwise direction to an inoperative first position whereat a rib 94 at the junction of the pedal top and second end walls 89 and 85, respectively, contacts the enclosure top wall sloped section 37. A knob 96 on the pedal rib 94 enters the enclosure sloped section opening 45 when the pedal is in its first position. The pedal is biased to its first position by a heavy spring 101. For that purpose, one end of the spring 101 is hooked through the hole 51 in the enclosure rib 49. The other end of the spring 101 is hooked in the depression 103 of the pedal arm 105.

The pedal 9 is pivotable in a counterclockwise direction on the enclosure to an operative second position until a rib 99 at the junction of the pedal first end wall 83 and the top wall 89 contacts the enclosure top wall first section 35, FIG. 5. A force F applied to the pedal near its first end wall causes the pedal to pivot toward its second position of FIG. 5. Removal of the force F causes the spring 101 to return the pedal to its first position of FIG. 4.

Base

To cover the open side of the enclosure 7, the base rests against the coplanar surfaces 50 of the enclosure posts 48. To add mass to the foot control 1, the base is made as a heavy steel plate. The base is joined to the enclosure by screws 107 that thread into associated posts. The bottom surface 59 of the enclosure longitudinal rib 55 with the jog 56 also contacts the base. That design gives ample support for a heavy weight on the enclosure trunnions 41 and top wall 33 such as, for example, a person standing on the pedal 9. Rubber feet 109 are integral part of the base. A rubber lug 111 and two rubber pins 112 upstand from the base (FIG. 1).

Also upstanding from the base 5 are two plates 113, as best shown in FIGS. 1, 6, and 7. The plates 113 are designed to fit within the openings 46 in the enclosure 7 when the base is joined to the enclosure. The base plates then lie alongside the enclosure tabs 71.

It is a feature of the invention that the pedal 9 cannot be removed from the enclosure 7 when the base 5 is joined to the enclosure. That is because forces P applied to the tab bosses 75 are resisted by the base plates 113, which do not allow the tabs 71 to bend. However, when the base is removed from the enclosure, the forces P do cause the tabs to bend and the bosses to be disengaged from the pedal holes 91. The pedal can then be removed from the enclosure, after also removing the spring 101.

Electrical Components and Assembly

To rotate the potentiometer 23 in response to pivoting of the pedal 9 on the enclosure 7, the shaft 21 is rotatably mounted in the slots 57 of the enclosure ribs 53 and 55. See FIGS. 2–6. A flange plug 115 is molded onto the first end 15 of the timing belt 13. The plug 115 fits within the pedal counterbored opening 97. The belt 13 is trained over the timing gear 19 on the shaft such that the belt meshes with approximately 90 degrees of the gear circumference. A connector 117 is molded onto the timing belt second end 17. One end of a spring 119, which is weaker than the spring 101, is hooked through a hole in the connector 117. The other end of the spring 119 is hooked through the hole 54 in the enclosure rib 52. The timing belt is therefore under tension.

The potentiometer 23, which is mechanically connected to the shaft 21, is electrically connected by wires 120 to a junction 121. Also electrically connected to the junction 121 is an on-off switch 123. The switch 123 fits in the pocket 65 of the enclosure 7. The switch includes a lever 125 that is located near the opening 45 in the enclosure top wall sloped section 37. When the base 5 is joined to the enclosure, the lug 111 on the base holds the switch in place in the enclosure pocket. In addition, the pins 112 on the base assure that the shaft 21 remains in the enclosure slots 57. The electrical cable 25 passes through the enclosure slot 81 and channel 79, which act as a strain relief, to connect with the junction 121.

Operation

In FIGS. 2 and 4, the pedal 9 is shown in the first position thereof relative to the enclosure 7. The spring 101 biases the pedal to its first position and overcomes the force of the smaller spring 119, which tends to bias the pedal to its second position. The timing belt first end 15 and plug 115 are then at a distance from the gear 19, the belt second end 17 and connector 117 are close to the gear, and the spring 119 is fully extended. The knob 96 enters the enclosure opening 45 and is in contact with the lever 125 of the switch 123 to open the switch. The switch is wired to the welding machine 3 to turn off the welding machine.

When the welding machine operator exerts his foot to press on the pedal 9 with a force F, the pedal pivots towards its second position, FIGS. 3 and 5. The knob 96 on the pedal retracts from the enclosure opening 45 and releases the lever 125 of the switch 123, thereby closing the switch and turning the welding machine 3 on. The belt first end 15 and plug 115 travel linearly to approach the gear 19. The spring 119 keeps tension on the timing belt, thus pulling the belt second end 17 and connector 117 away from the gear. The result is that the gear rotates in a counterclockwise direction with respect to FIGS. 4 and 5. The potentiometer 23 also rotates. The potentiometer is wired into the control of the welding machine to produce increased power from the welding machine proportional to the position of the pedal towards its second position. Releasing or reducing the force F causes the spring 101 to return the pedal toward its first position, thereby rotating the gear without backlash in the opposite direction and decreasing the power output from the welding machine. Fully releasing the pedal causes it to return to its first position of FIGS. 2 and 4, whereat the knob 96 actuates the switch lever 125 to turn off the welding machine.

Thus, it is apparent that there has been provided, in accordance with the invention, a remote foot control for TIG welding that fully satisfies the aims and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A remote foot control for a TIG welding machine comprising:
   a. an enclosure having an open side;
   b. pedal means hinged to the enclosure for pivoting thereon between first and second positions;
      i) the pedal means defining a pair of holes therethrough: and
      ii) the enclosure comprising a pair of side walls each fabricated with a respective resilient tab, each tab having an out turned boss that engages an associated hole in the pedal means to retain the pedal means to the enclosure, the tab bosses being selectively forcible out of engagement with the pedal means holes to thereby enable the pedal means to be removed from the enclosure;
   c. a timing gear mounted for rotation in the enclosure;
   d. belt means extending between the pedal means and the enclosure for rotating the timing gear in response to pivoting of the pedal means on the enclosure;
   e. first biasing means for biasing the pedal to the first position thereof independent of the belt means; and
   f. electrical means for varying the power from the welding machine in response to the rotation of the timing gear.

2. The remote foot control of claim 1 further comprising a base joined to the open side of the enclosure and made of a heavy material to thereby provide mass to the foot control, the base having a pair of plates that lie alongside associated tabs of the enclosure to prevent the tab bosses from being forced out of engagement with the holes in the pedal means, so that the pedal means cannot be removed from the enclosure when the base is joined to the enclosure.

3. The remote foot control of claim 2 wherein:
   a. the electrical means comprises a switch fit into the enclosure adjacent an opening through the enclosure; and
   b. the pedal means comprises a knob that enters the enclosure opening to contact the switch and turn off the welding machine when the pedal means is in the first position thereof, and that retracts from the enclosure opening to release the switch and turn on the welding machine when the pedal means pivots away from the first position thereof.

4. The remote foot control of claim 3 wherein the base means comprises lug means for holding the switch in the enclosure when the base means is joined to the enclosure.

5. The remote foot control of claim 2 wherein the enclosure comprises a top wall and at least one longitudinally extending rib under the top wall, the rib having a bottom surface in contact with the base, so that the rib aids in supporting a heavy weight on the enclosure top wall.

6. A remote foot control for a TIG welding machine comprising:

a. an enclosure having an open side;

b. pedal means hinged to the enclosure for pivoting thereon between first and second positions;

c. a timing gear mounted for rotation in the enclosure;

d. belt means extending between the pedal means and the enclosure for rotating the timing gear in response to pivoting of the pedal means on the enclosure, the belt means further comprising;
  i) a timing belt meshing for approximately 90 degrees with the timing gear and having a first end secured to the pedal means and a second end; and
  ii) second biasing means connected between the timing belt second end and the enclosure for providing a tension on the timing belt that biases the pedal means toward the second position thereof;

e. first biasing means for biasing the pedal to the first position thereof independent of the belt means; and f. electrical means for varying the power from the welding machine in response to the rotation of the timing gear.

7. A remote foot control for a TIG welding machine comprising:

a. an enclosure having an open side;

b. pedal means hinged to the enclosure for pivoting thereon between first and second positions;
  i) the pedal means comprising a plurality of concentric concave arcuate surfaces having a common selected radius; and
  ii) the enclosure comprising trunnion means for pivotally supporting the pedal means arcuate surfaces on the enclosure;

c. a timing gear mounted for rotation in the enclosure;

d. belt means extending between the pedal means and the enclosure for rotating the timing gear in response to pivoting of the pedal means on the enclosure;

e. first biasing means for biasing the pedal to the first position thereof independent of the belt means; and f. electrical means for varying the power from the welding machine in response to the rotation of the timing gear.

8. The remote foot control of claim 7 wherein the enclosure trunnion means comprises:

a. a pair of trunnions each having the selected radius and each having an apex with a shallow groove therein; and b. grease means in the trunnion grooves for lubricating the trunnion and the pedal means arcuate surfaces.

9. In combination with a TIG welding machine having a variable power output, a remote foot control operable by a person comprising:

a. an enclosure having an open side;

b. a pedal removably hinged to the enclosure for pivoting by the person's foot between first and second positions;

c. first biasing means for biasing the pedal to pivot to the first position on the enclosure;

d. a belt having a first end secured to the pedal and a second end;

e. second biasing means attached to the belt second end for tensioning the belt and for biasing the pedal to pivot toward the second position thereof on the enclosure; and f. potentiometer means meshing with the belt for varying the power output of the welding machine in response to the pedal pivoting between the first and second positions thereof.

10. The combination of claim 9 further comprising base means for preventing the pedal from being removed from the enclosure when the base means is joined to the enclosure.

11. The combination of claim 10 wherein:

a. the enclosure comprises tab means for engaging associated holes in the pedal to retain the pedal to the enclosure, the tab means being selectively depressible to disengage tile tab means from the pedal and thereby enable the pedal to be removed from the enclosure; and b. the base means comprises plate means for preventing the enclosure tab means from being depressed and disengaged from the pedal when the base means is joined to the enclosure.

12. The combination of claim 11 wherein:

a. the enclosure comprises a top wall and at least one trunnion having a predetermined radius on the top wall; and b. the pedal comprises a plurality of concave arcuate surfaces of the predetermined diameter, the pedal concave surfaces being supported on the enclosure trunnion when the enclosure tab means engage the pedal holes to thereby hinge the pedal on the enclosure.

13. The combination of claim 12 wherein:

a. the enclosure further comprises at least one longitudinally extending rib depending from the top wall and having a bottom surface near the enclosure open side; and b. the base means is joined to the enclosure in contact with the bottom surface of the longitudinally extending rib to thereby provide support for a heavy weight on the pedal and on the enclosure trunnion and top wall.

14. The combination of claim 10 wherein:

a. the potentiometer means comprises:
  i. a shaft mounted for rotation in the enclosure;
  ii. a gear fixed to the shaft and meshing with the belt; and
  iii. a potentiometer fixed to the shaft; and b. the belt travels past the gear and rotates the gear in response to pivoting of the pedal on the enclosure, so that the potentiometer varies the output of the welding machine in response to pivoting of the pedal on the enclosure.

15. The combination of claim 14 wherein the belt meshes with the gear for approximately 90 degrees of the gear circumference.

16. The combination of claim 14 wherein:

a. a switch is received in the enclosure; and b. the base means comprises lug means for holding the switch in the enclosure, and pin means for assuring that the shaft remains in the enclosure when the base means is joined to the enclosure.

17. A method of controlling the power output of a TIG welding machine comprising the steps of:
 a. hinging a pedal on an enclosure by;
  i) providing the pedal with a pair of concentric holes;
  ii) providing the enclosure with a pair of resilient tabs each having a boss; and
  iii) engaging the pedal holes with the bosses of the associated enclosure tabs;
 b. biasing the pedal to pivot on the enclosure to a first position;
 c. tensioning a belt between the pedal and the enclosure and biasing the pedal to pivot on the enclosure toward a second position;
 d. meshing the belt with a gear;
 e. pivoting the pedal on the enclosure;
 f. rotating the gear with the belt in response to pivoting the pedal on the enclosure; and
 g. controlling the power output of the welding machine in response to rotating the gear.

18. The method of claim 17 comprising the further steps of:
 a. depressing the bosses of the enclosure tabs out of engagement with the pedal holes; and
 b. removing the pedal from the enclosure.

19. The method of claim 18 comprising the further steps of:
 a. providing a base having a pair of upstanding plates; and
 b. joining the base to the enclosure with the base plates lying alongside associated tabs of the enclosure and thereby preventing the tab bosses from being depressed out of engagement with the pedal holes.

20. A method of controlling the power output of a TIG welding machine comprising the steps of:
 a. hinging a pedal on an enclosure;
 b. biasing the pedal to pivot on the enclosure to a first position;
 c. tensioning a belt between the pedal and the enclosure and biasing the pedal to pivot on the enclosure toward a second position by;
  i) securing a first end of the belt to the pedal; and
  ii) attaching a second end of the belt to a spring and attaching the spring to the enclosure;
 d. meshing the belt with a gear by meshing the belt approximately 90 degrees on the gear circumference;
 e. pivoting the pedal on the enclosure;
 f. rotating the gear with the belt in response to pivoting the pedal on the enclosure; and
 g. controlling the power output of the welding machine in response to rotating the gear.

21. A method of controlling the power output of a TIG welding machine comprising the steps
 a. hinging a pedal on an enclosure;
 b. biasing the pedal to pivot on the enclosure to a first position;
 c. tensioning a belt between the pedal and the enclosure and biasing the pedal to pivot on the enclosure toward a second position;
 d. meshing the belt with a gear;
 e. pivoting the pedal on the enclosure;
 f. rotating the gear with the belt in response to pivoting the pedal on the enclosure; and
 g. controlling the power output of the welding machine in response to rotating the gear by;
  i) providing a knob on the pedal;
  ii) providing a switch in the enclosure;
  iii) pivoting the pedal to the first position thereof and simultaneously passing the pedal knob through an opening in the enclosure and contacting the switch; and
  iv) turning off the welding machine in response to contacting the switch by the pedal knob.

* * * * *